(12) United States Patent
Pavlovic et al.

(10) Patent No.: US 11,522,319 B2
(45) Date of Patent: Dec. 6, 2022

(54) RFID-ENABLED ELECTRICAL CONNECTOR

(71) Applicant: GLOBAL INVENTIVE CONSULTING INC., Etobicoke (CA)

(72) Inventors: Slobodan Pavlovic, Etobicoke (CA); Mohamad Zeidan, Bloomfield Hills, MI (US)

(73) Assignee: Global Inventive Consulting Inc., Etobicoke (CA)

( * ) Notice: Subject to any disclaimer, the term of this patent is extended or adjusted under 35 U.S.C. 154(b) by 135 days.

(21) Appl. No.: 16/894,950

(22) Filed: Jun. 8, 2020

(65) Prior Publication Data

US 2021/0384677 A1   Dec. 9, 2021

(51) Int. Cl.
  *H01R 13/641* (2006.01)
  *G06K 19/073* (2006.01)
  *H01R 13/66* (2006.01)

(52) U.S. Cl.
  CPC ..... *H01R 13/641* (2013.01); *G06K 19/07363* (2013.01); *H01R 13/6608* (2013.01)

(58) Field of Classification Search
  CPC ............. H01R 13/641; H01R 13/6608; G06K 19/07363
  See application file for complete search history.

(56) References Cited

U.S. PATENT DOCUMENTS

| | | | | |
|---|---|---|---|---|
| 9,219,358 B2* | 12/2015 | Elberbaum | .......... | H05K 5/0017 |
| 10,794,121 B2* | 10/2020 | Hanton | ................... | E21B 17/06 |
| 10,915,714 B2* | 2/2021 | Ownby | ................... | E21B 23/04 |
| 10,949,558 B2* | 3/2021 | Dunaway | ............... | G16H 10/60 |
| 2007/0149013 A1* | 6/2007 | Eastham | ............ | H01R 13/7036 439/140 |
| 2011/0097925 A1* | 4/2011 | Caveney | ................ | H04Q 1/149 439/488 |
| 2014/0099808 A1* | 4/2014 | McClelland | ....... | H01R 13/6205 439/153 |
| 2014/0191030 A1* | 7/2014 | Reineccius | ............. | B60L 53/65 235/381 |
| 2020/0127451 A1* | 4/2020 | Elberbaum | ............ | G08C 23/06 |

FOREIGN PATENT DOCUMENTS

| | | | |
|---|---|---|---|
| DE | 102017 110 123 | * | 10/2017 |
| KR | 20180071368 | * | 6/2018 |
| WO | 2020052969 | * | 3/2019 |

* cited by examiner

*Primary Examiner* — Jean F Duverne
(74) *Attorney, Agent, or Firm* — HeedLaw Group; Thomas P. Heed

(57) ABSTRACT

The present invention is an RFID-enabled electrical connector with connector position assurance ("CPA") features. The RFID tag is only readable after the CPA features have been fully deployed. The electrical connector is comprised of at least two parts, a socket and a plug. In the illustrated embodiment, a connector housing is positioned between the socket and plug, with both the socket and plug connecting to the connector housing. Until the CPA feature has been fully deployed, the RFID tag is covered by an electrically conductive material, preferably an electrically conductive plastic. The RFID tag can only be properly read after the CPA feature has been fully deployed. To prevent signal leakage, the RFID tag can alternately be placed inside a five-sided box fabricated from electrically conductive material, preferably electrically conductive plastic.

25 Claims, 4 Drawing Sheets

RFID-ENABLED ELECTRICAL CONNECTOR

FIELD OF INVENTION

This invention relates to the classification of electrically-conductive connections, and to one or more sub-classifications under means for preventing, inhibiting, or avoiding incorrect coupling. Specifically, this invention is a push-in electrical connector secured by an interior spring mechanism.

BACKGROUND OF INVENTION

Over the past several decades, the amount of electronics in in motor vehicles has increased substantially. Electronics are used to improve performance, control emissions, and provide creature comforts to the occupants and users of the motor vehicles. Motor vehicles are a challenging electrical environment due to vibration, heat, and longevity. Heat, vibration, and aging can all lead to connector failure. In fact, loose connectors, both in the assembly plant and in the field, are one of the largest failure modes for motor vehicles. Considering that just the aggregate annual accrual for warranty by all of the automotive manufacturers and their direct suppliers is estimated at between $50 billion and $150 billion, worldwide, a large failure mode in automotive is associated with a large dollar amount.

The category with the highest warranty and quality cost in automotive industry are electrical connections, specifically mis-seated electrical connections. These warranty problems are caused by an incomplete connector mating process at the vehicle assembly lines, as there are no reliable methods to assure and record/verify that an electrical connector is fully mated.

Connector design has evolved numerous features in order to address this issue. One of the most common features is Connector Position Assurance ("CPA"). A CPA feature is a secondary lock that cannot be engaged until the connector is fully seated. CPA features have not resolved the overall warranty problems, because there is no contemporaneous method, measurement, or record proving that the CPA feature is being properly installed and deployed.

Another large source of warranty related to electrical connectors in automotive involves high-power connections to alternators, batteries, power, and power junction boxes. With hybrid engines, there are even more high-power connections. The most common solution for this type of connection is the eyelet. An eyelet is a metal fitting requiring a thread fastener and nut. Although eyelets are specified as requiring a certain torque and angle during installation, there is no method, measurement, or record to prove the eyelet is being properly installed and deployed. Eyelets are being displaced because of the substantial cost of installation and the cost of warranty.

High-power/high-voltage ("HP/HV") connectors with spring-loaded actuators are displacing eyelets. There is a demand that the new HP/HV connector designs yield recordable proof that they have been correctly installed. Such records do not currently exist.

The industry currently uses sub-standard solutions for recording installation. For example, barcodes are used with CPA features. The barcode is placed in a position in which it can only be read when the CPA is fully seated. Unfortunately, this method only works if an open area exists around the CPA, so that a barcode reader can access the barcode. In most of cases such space is not available and this method is not complete solution for connector assembly process. Moreover, this method of error-proofing is expensive, as an employee is usually used to read the bar-code The automotive market has a need for a method that records that each electrical connector has been properly installed. The method should be quick, inexpensive, and error-proofed. No such solution exists today.

SUMMARY OF THE INVENTION

This summary is intended to disclose the present invention, an RFID-enabled Electrical Connector. The embodiments and descriptions are used to illustrate the invention and its utility, and are not intended to limit the invention or its use. In the illustrated embodiment, the RFID-enabled Electrical Connector is embedded in a CPA feature.

RFID, or radio-frequency identification, uses electromagnetic fields generated by an RFID reader to automatically identify an object with an RFID tag. An RFID tag consists of a miniature radio transmitter and receiver on which is stored a unique string of digital data. The RFID reader transmits a digital pulse which causes the RFID tag to transmit its string of digital data in response. This string of digital data is usually interpreted as an inventory control number, serial number, or other unique alphanumeric code. An RFID tag can be either passive or active. A passive RFID tag is momentarily energized by the pulse from the RFID reader, causing the passive RFID tag to transmit its string of digital data. An active RFID tag is powered by an onboard battery, which will give it superior transmission range. Unlike a barcode, an RFID tag doesn't need to be within the line of sight of the reader, so it may be embedded in a tracked object.

An electrical connector will typically have a plug or male portion and a socket or female portion. In connectors with a CPA feature, the CPA feature is typically included in the socket. The plug is first fully inserted into the socket, engaging the CPA feature. This usually creates an initial "click" indicating that the housing of the plug has engaged an inbound connector tab on the CPA feature of the socket. When the inbound connector tab engages, it enables an outbound connector tab. The plug of the connector is then partially pulled out of the socket of the connector, creating a second "click" indicating that the outbound connector tab has locked the plug into position with respect to the socket.

This invention uses an RFID tag in combination with a CPA feature. When the RFID tag is covered by the conductive material, it is shielded. When the RFID is shielded by the conductive material, the RFID reader cannot energize the RFID tag, because the RFID signal cannot reach the RFID antenna. When the RFID-enabled Electrical Connector is improperly installed, the CPA feature is not properly seated and conductive material covers the RFID tag. This prevents the RFID reader from reading the RFID tag. When the RFID-enabled Electrical Connector is properly installed, the proper seating of the CPA feature exposes the RFID tag, allowing the RFID tag to be read by the RFID reader.

For example, the RFID tag is embedded in the housing of the plug. The socket has conductive material that covers the RFID tag when the plug is fully inserted into the socket. When the plug is partially retracted from the socket, locking the outbound tab in place, the RFID tag is exposed, allowing the RFID reader to read the RFID tag. The conductive material is preferably a conductive polymer, although the invention works with metallized plastic, as well.

The RFID tag is overmolded into the housing of the plug during fabrication of the plug. The housing of the plug is made of non-conductive polymers. Alternately, the RFID tag can be printed on the plug during fabrication of the plug. Ideally, the RFID tag is placed within a cavity or well in the plug housing. This allows the CPA feature to better cover the RFID tag when the connector has not been properly seated. The back of the RFID tag can be plated to prevent signal from leaking through the plug housing and energizing the RFID tag from the back. If needed, the cavity on the plug housing containing the RFID tag can be overmolded with conductive plastic to prevent signal from the RFID reader from reaching the RFID tag from the sides.

Alternately, to improve overall noise immunity for the RFID tag and reader system, a 5-sided box made of conductive plastic material or other conductive material can be fabricated. The RFID tag is placed in the 5-sided shielded box. The 5-side shielded box is then placed in the cavity on the plug housing.

BRIEF DESCRIPTION OF THE DRAWINGS

The present invention is illustrated with 5 drawings on 3 sheets.

DETAILED DESCRIPTION OF THE DRAWINGS

The following descriptions are not meant to limit the invention, but rather to add to the summary of invention, and illustrate the present invention, by offering and illustrating various embodiments of the present invention, an RFID-enabled Electrical Connector 1. While embodiments of the invention are illustrated and described, the embodiments herein do not represent all possible forms of the invention. Rather, the descriptions, illustrations, and embodiments are intended to teach and inform one skilled in the art without limiting the scope of the invention.

Figure 1:
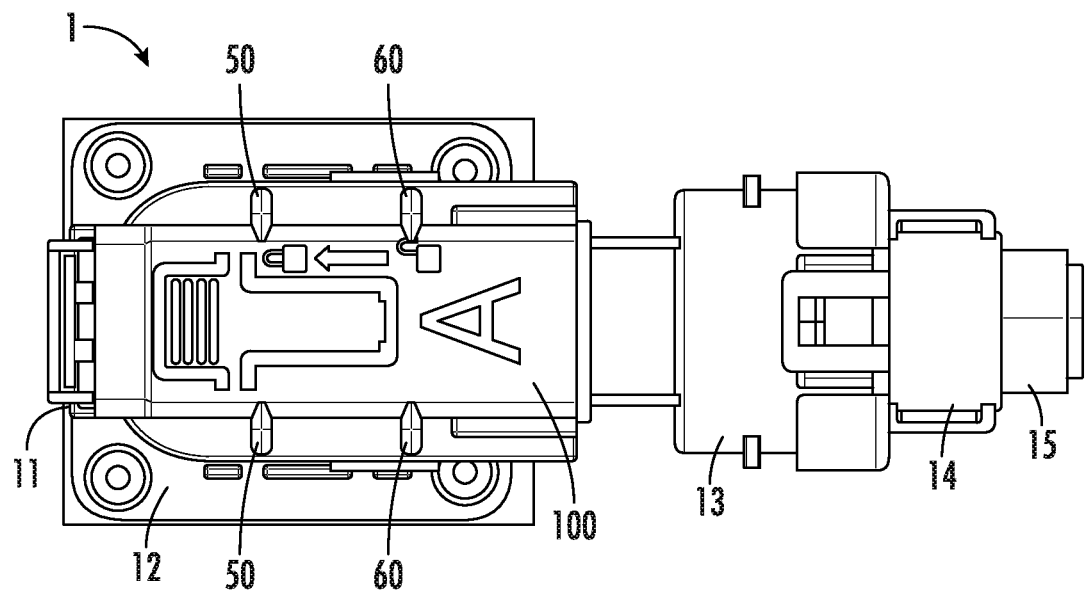
FIG. 1 is a top view of a terminal plug fully inserted into a socket with a CPA feature.
Figure 2:
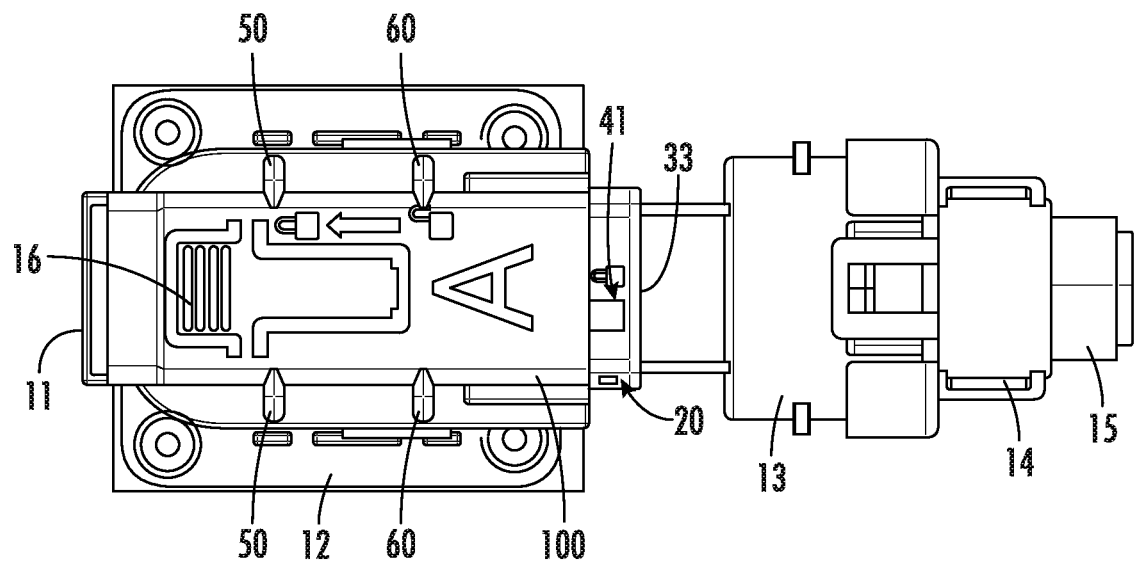
FIG. 2 is a top view of a terminal plug retracted from the socket with the CPA feature, so that the CPA feature is fully engaged.
Figure 3:
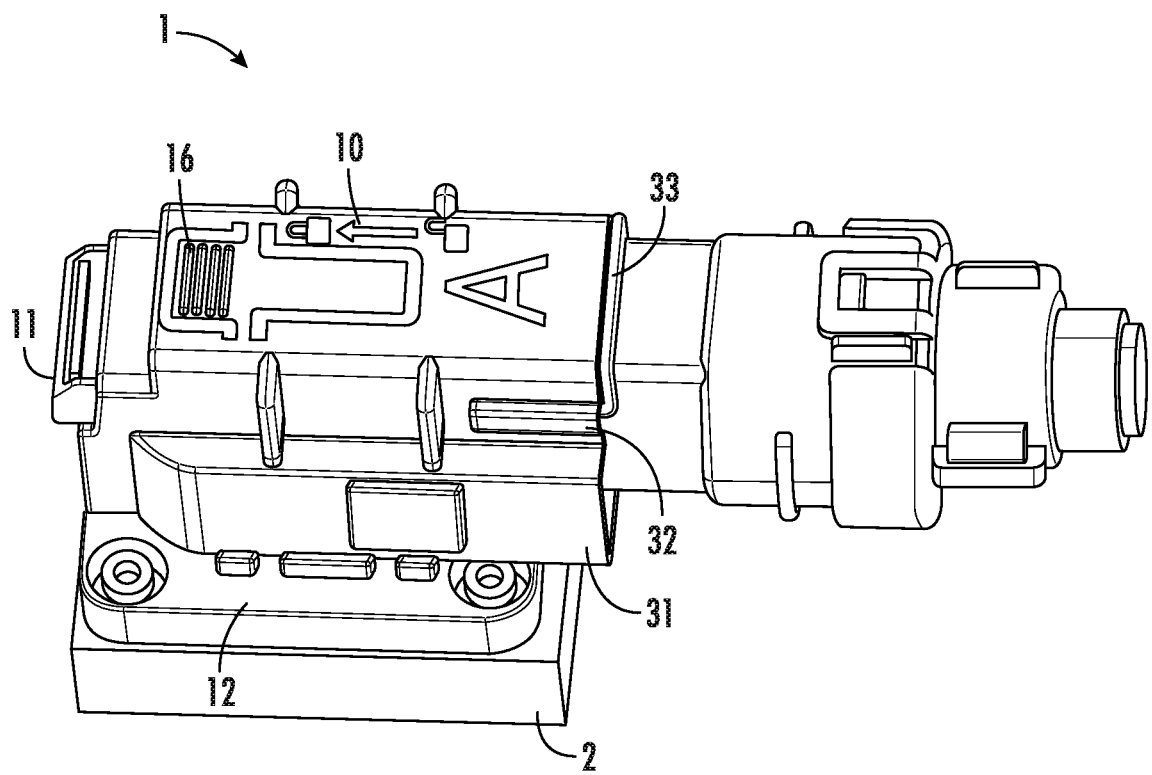
FIG. 3 is a perspective view of a terminal plug fully inserted into a socket with a CPA feature.
Figure 4:
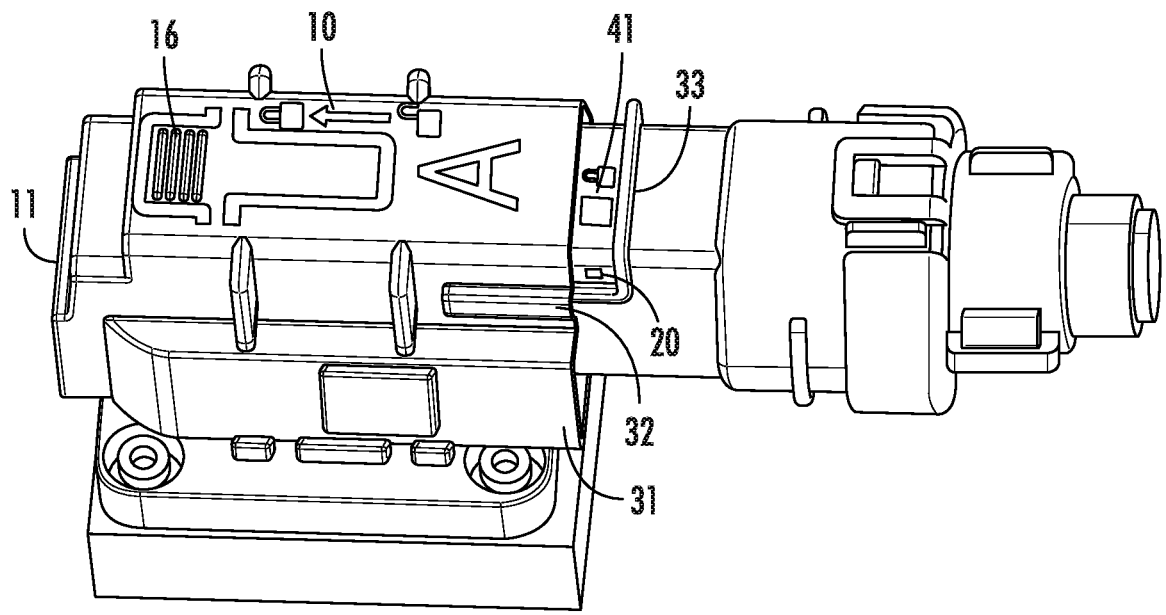
FIG. 4 is a perspective view of a terminal plug retracted from the socket with the CPA feature, so that the CPA feature is fully engaged.

FIGS. 1-4 show the present invention, an RFID-enabled Electrical Connector 1. FIGS. 1 and 3 show the CPA feature unlocked. FIGS. 2 and 4 show the CPA feature locked. The RFID-enabled Electrical Connector 1 has a socket 31, a connector housing 13, and a plug 14. The plug 14 is connected directly to an electrical wire 15.

The socket 31 has a number of CPA features: a latch 11, a release 16, a first lock indicator tabs 60, a second lock indicator tabs 50, a CPA lock tab 41, and a visual indicator 10. The socket 31 also has a mating ridge 32 to accept a portion of the ridge 33 on the connector housing 13. The socket 31 has a base 12 that interfaces with a circuit-board 2, or a similar electrical interface.

The connector housing 13 is mated with the plug 14. The connector housing 13 is then inserted into the socket 31. The direction of insertion is indicated 10. The connector housing 13 encounters resistance when it hits the first lock indicator tab 60, indicating that there is an internal locking tab that the insertion force must overcome. The connector housing 13 then encounters resistance when it hits the second lock indicator tab 50, indicating that there is a second internal locking tab that the insertion force must overcome. When the connector housing 13 is fully inserted into the socket 31, the latch is exposed 11. A ridge 33 on the connector housing 13 also acts as a stop. The ridge 33 also acts as a guide that inserts in a mating ridge 32 on the socket housing 100.

Once the connector housing 13 is fully inserted into the socket 31, the latch must be pressed, which causes the connector housing 13 to retract slightly with respect to the socket 31. This means that the CPA features 11, 16, 60, 50, 41, and 10 have been properly deployed. The connector housing 13 is positionally locked with respect to the socket 31 when the CPA features 11, 16, 60, 50, 41, and 10 have been properly deployed. In the fully inserted position, prior to the latch 11 being pressed, the connector housing 13 is not positionally locked with respect to the socket 31. In other words, the CPA features 11, 16, 60, 50, 41, and 10 have not properly deployed. In the fully inserted position, prior to the latch 11 being pressed, the connector housing 13 is in full electrical contact with the socket 31, which is the state that allows the latch 11 to be exposed. Of course, CPA connector systems can be accomplished with variations of the above. The problem with current CPA connector systems is that there is no way to assure that the CPA features 11, 16, 60, 50, 41, and 10 have been properly deployed and that the connector housing 13 is positionally locked with respect to the socket 31.

Figure 5:
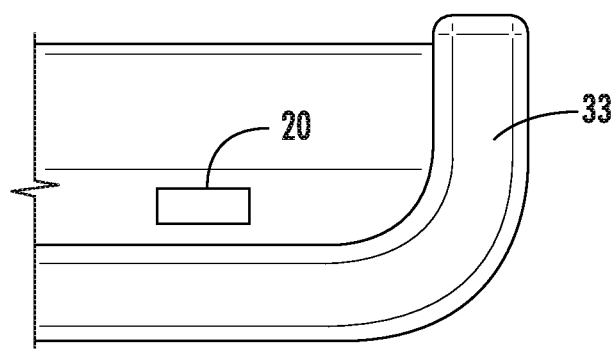
FIG. 5 is a close-up isolation view of an RFID tag embedded on a connector housing ridge.

The present invention 1 builds on the prior art by adding an RFID tag 20, which can be read by an RFID reader only when the CPA features 11, 16, 60, 50, 41, and 10 have been properly deployed and that the connector housing 13 is positionally locked with respect to the socket 31. An RFID tag 20 is typically a three-dimensional right rectangle with six sides. The RFID tag 20 is affixed in some manner to one of the components of the RFID-enabled electrical connector 1. In this embodiment, a passive RFID tag 20 is shown in FIGS. 2 and 4 as being embedded within the connector housing 13 ridge 33. The socket housing 100 is fabricated from an electrically conductive material, such as an electrically conductive polymer. When the connector housing 31 has been fully inserted into the socket 31, exposing the latch 11, as shown in FIGS. 1 and 3, the electrically conductive polymer of the socket housing 100 shields the RFID tag 20, obscuring it from an RFID reader. In other words, the electrically conductive material shields the RFID tag 20 from the radio frequency signals of the RFID reader. FIG. 5 is an isolated close-up of the RFID tag 20 embedded on the ridge 33 of the connector housing 13. An RFID reader would be unable to energize the RFID tag 20 in this position. Once the latch 11 is pressed, forcing the connector housing 13 to partially retract from the socket 31, the RFID tag 20 is exposed, as shown in FIGS. 2 and 4. In this state, an RFID reader would be able to easily energize the RFID tag 20, and read its identifying information. This would give positive confirmation that the RFID-enabled electrical connector 1 is in its proper position, with proper electrical connection being made.

Depending on the frequencies used by the RFID tag 20 and the field strength of the RFID reader, leakage is possible. In order to prevent stray leakage, potentially resulting in a false reading, the connector housing 13 may also be fabricated from an electrically conductive material, such an electrically conductive polymer. In an alternative embodiment, the connector housing 13 can be fabricated from traditional connector housing polymers, and just the ridge 33 can be formed from an electrically conductive material, such as an electrically conductive polymer. In this embodiment, the ridge 33 formed from an electrically conductive polymer surrounds the RFID tag 20 on five sides. Only the top surface of the RFID tag 20 is exposed. Functionally, the RFID tag 20 is in a five-sided box constructed within the ridge 33. As a further embodiment to the present invention 1, the RFID tag 20 may be contained in a dedicated five-sided box fabricated from electrically conductive polymer.

Figure 6:
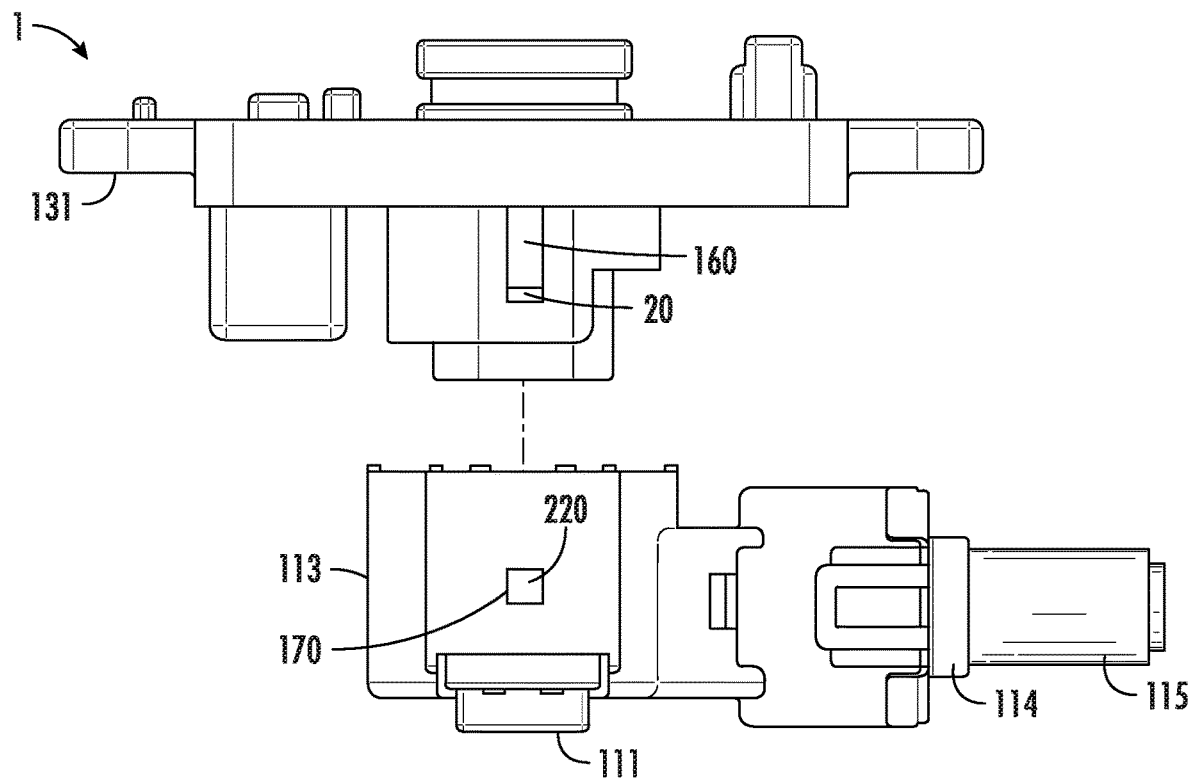
FIG. 6 is a front view of an alternative embodiment of a connector with a CPA with the present invention, with the socket and connector housing unattached.
Figure 7:
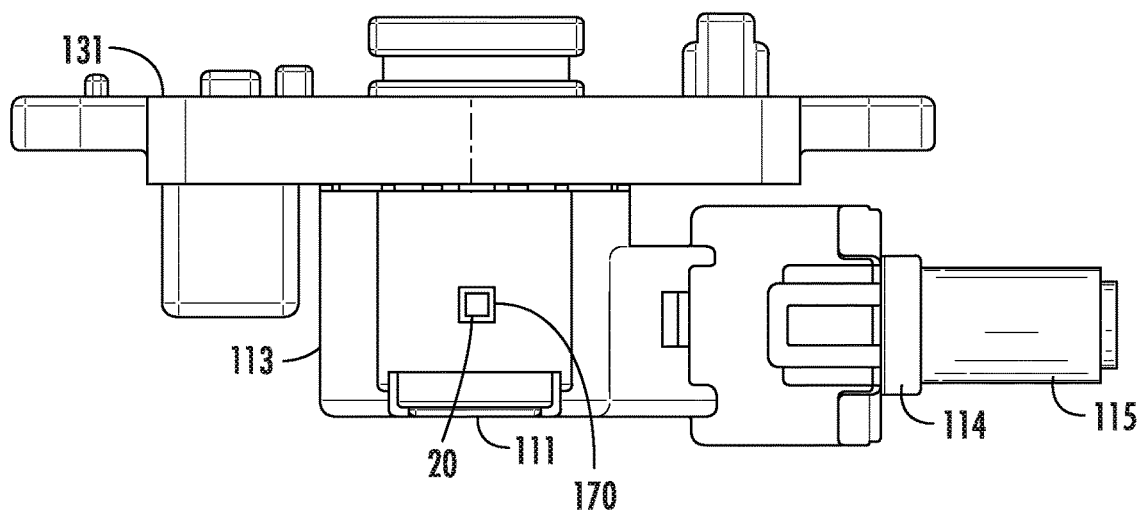
FIG. 7 is a front view of an alternative embodiment of a connector with a CPA with the present invention, with the socket and connector housing attached.

FIGS. 6 and 7 show the same invention 1 implemented on a different type of connector with CPA. A socket 131 that inserts into a connector housing 113 is shown. The socket 131 has a locking tab 160, below which is affixed an RFID tag 20. The RFID tag 20 can be affixed to the socket 131 by being printed on the socket 131, being glued to the socket 131, or being embedded into the socket 131 during molding. The connector housing 113 is attached to a plug 114, which in turn, is connected directly to an electrical wire 115. In this embodiment, the socket 131 is inserted into the connector housing 113. When the socket 131 is properly inserted into the connector housing 113, a CPA latch 111 is enabled. When the CPA latch 111 is depressed, the socket 131 and connector housing 113 are correctly positioned and locked into place.

The connector housing 113 is made from an electrically conductive material, such as an electrically conductive polymer. The connector housing 113 has an RFID window 170. There is a void 220 in the center of the RFID window 170. When the socket 131 is properly seated in the connector housing 113, and the CPA latch 111 has been depressed (compare FIG. 6 to FIG. 7), the RFID-enabled connector 1 is properly attached, and the RFID tag 20 can be read through the RFID window 170. When the CPA features of this connector have not been properly deployed, the RFID tag will be obscured from an RFID reader by the electrically conductive material of the connector housing 113.

In FIG. 7, the RFID-enabled connector 1 is properly mated. The RFID tag 20 attached to the socket 131 is positioned within the RFID window 170 of the connector housing 131. The void 220 in the electrically conductive material of the connector housing 113 allows the RFID tag 20 to be energized and read by an RFID reader.

We claim:

1. An RFID-enabled electrical connector comprised of
   a socket having a housing with a deployable connector position assurance ("CPA") feature;
   a plug; and
   an RFID tag;
   wherein the CPA feature is comprised of a secondary lock that cannot be engaged until the connector is fully seated; and
   wherein an electrically conductive material obscures the RFID tag from being read by an RFID reader until the secondary lock of the CPA feature has been engaged.

2. The RFID-enabled electrical connector of claim 1, wherein the RFID tag is passive, meaning that the RFID tag has no independent power source and the RFID tag relies on the field generated by an RFID reader in order to be energized.

3. The RFID-enabled electrical connector of claim 2, wherein, when the CPA features have not been properly deployed, the RFID tag is obscured from being read by the RFID reader because the electrically conductive material shields the RFID tag from the radio frequency signals of the RFID reader.

4. The RFID-enabled electrical connector of claim 3, wherein the electrically conductive material is an electrically conductive polymer.

5. The RFID-enabled electrical connector of claim 4, further comprising a connector housing, connected to the plug, and wherein the connector housing is capable of being inserted into the socket in such a way as to fully deploy all of the CPA features and creating an electrical connection between the plug and the socket.

6. The RFID-enabled electrical connector of claim 5,
   wherein the RFID tag is affixed to the connector housing; and
   wherein the socket housing is fabricated from the electrically conductive polymer, resulting in the RFID tag being obscured from the RFID reader when the CPA features have not been properly deployed.

7. The RFID-enabled electrical connector of claim 6, wherein the RFID tag is partially embedded in the connector housing.

8. The RFID-enabled electrical connector of claim 7, wherein the RFID tag is a three-dimensional right rectangle with six sides.

9. The RFID-enabled electrical connector of claim 8, wherein the RFID tag is embedded on five sides within the connector housing.

10. The RFID-enabled electrical connector of claim 9, wherein the five sides of the connector housing surrounding the RFID tag are fabricated from an electrically conductive material.

11. The RFID-enabled electrical connector of claim 10, wherein the electrically conductive material surrounding the RFID tag is an electrically conductive polymer.

12. The RFID-enabled electrical connector of claim 11, wherein the entire connector housing is fabricated from an electrically conductive polymer.

13. The RFID-enabled electrical connector of claim 12, wherein, when the connector housing has been fully inserted into the socket, the RFID tag is within the socket housing.

14. The RFID-enabled electrical connector of claim 13, wherein one of the CPA features is a latch that is enabled when the connector housing is fully inserted into the socket.

15. The RFID-enabled electrical connector of claim 14, wherein, after being enabled, depressing the latch will cause the connector housing to retract slightly from the socket, locking the connector housing into a final position with respect to the socket, and exposing the RFID tag.

16. The RFID-enabled electrical connector of claim 4, further comprising a connector housing, connected to the plug, and wherein the socket is capable of being inserted into the connector housing in such a way as to fully deploy all of the CPA features and creating an electrical connection between the plug and the socket.

17. The RFID-enabled electrical connector of claim 16,
   wherein the RFID tag is affixed to the socket;
   wherein the connector housing is fabricated from the electrically conductive polymer;
   wherein the connector housing has an RFID window in which the RFID tag is readable when the CPA features have been properly deployed; and
   wherein the RFID tag is obscured from the RFID reader when the CPA features have not been properly deployed, because the RFID tag is not positioned within the RIFD window.

18. The RFID-enabled electrical connector of claim 17, wherein the RFID tag is partially embedded in the socket.

19. The RFID-enabled electrical connector of claim 18, wherein the RFID tag is a three-dimensional right rectangle with six sides.

20. The RFID-enabled electrical connector of claim 19, wherein the RFID tag is embedded on five sides within the socket.

21. The RFID-enabled electrical connector of claim 20, wherein the five sides of the socket surrounding the RFID tag are fabricated from an electrically conductive material.

22. The RFID-enabled electrical connector of claim 21, wherein the electrically conductive material surrounding the RFID tag is an electrically conductive polymer.

23. The RFID-enabled electrical connector of claim 22, wherein the entire socket is fabricated from an electrically conductive polymer.

24. A method of assuring the proper connection of an RFID-enabled electrical connector comprising the steps of
identifying a socket with CPA features and a housing fabricated from electrically conductive plastic;
inserting a connector housing with an affixed RFID tag and an attached plug into the socket;
shielding the RFID tag from being read by positioning it within the electrically conductive plastic of the socket housing;
pushing the connector housing into the socket until a latch, one of the CPA features of the socket, is enabled;
depressing the latch to partially retract the connector housing relative to the socket;
locking the connector housing into a final position with respect to the socket;
exposing the RFID tag embedded in the connector housing; and
reading the RFID tag embedded in the connector housing.

25. A method of assuring the proper connection of an RFID-enabled electrical connector comprising the steps of
identifying a connector housing, fabricated from an electrically conductive polymer, and having an RFID window
inserting a socket with an affixed RFID tag into the connector housing;
shielding the RFID tag from being read by positioning it within the electrically conductive plastic of the connector housing;
pushing the socket into the connector housing until a latch, a CPA feature of the socket, is enabled;
depressing the latch to correctly position the connector housing relative to the socket;
locking the connector housing into a final position with respect to the socket;
exposing the RFID tag in the RFID window; and
reading the RFID tag embedded in the connector housing.

* * * * *